UNITED STATES PATENT OFFICE.

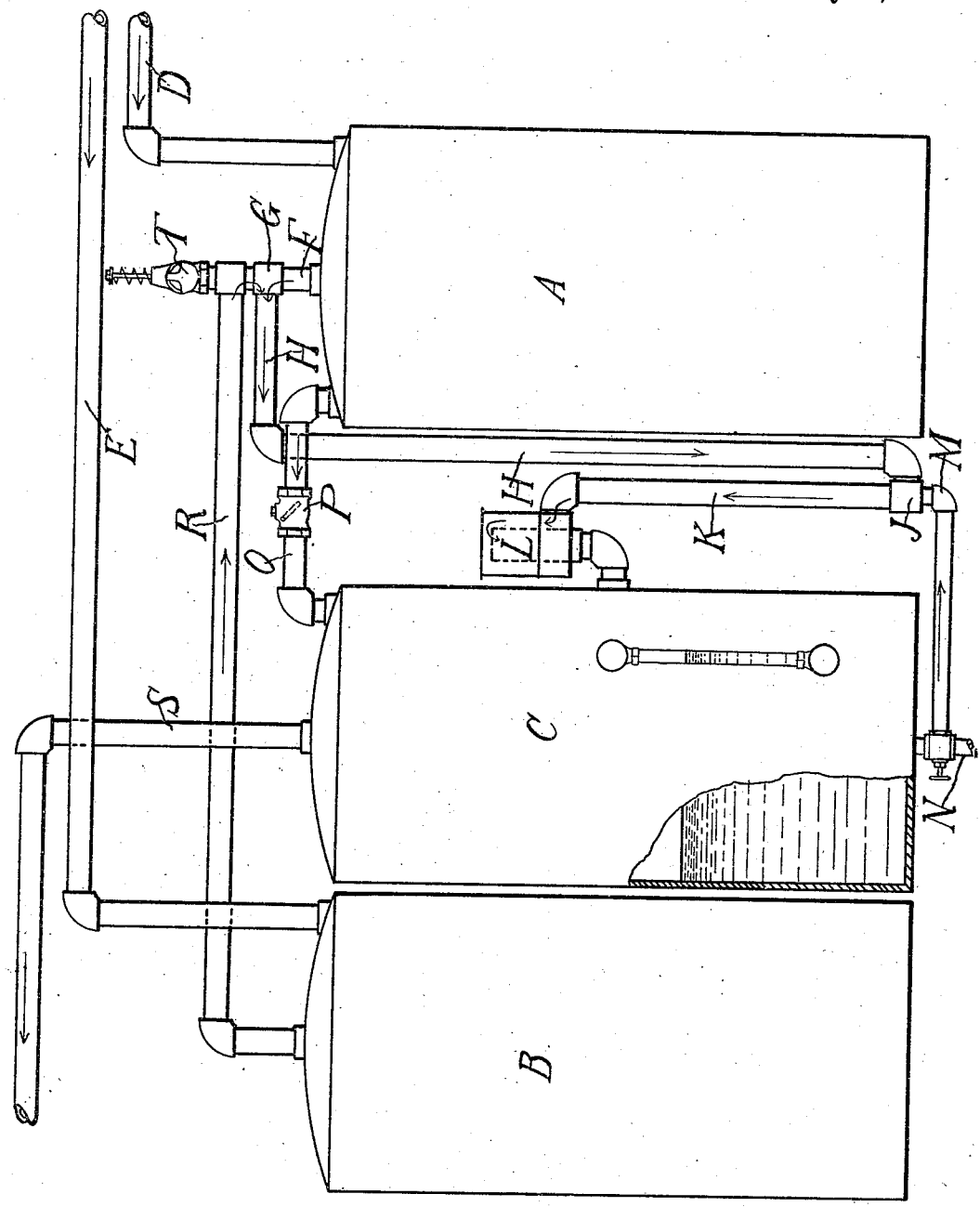

GEORGE CLEMENTS AND JAMES M. HOSTLER, OF CHICAGO, ILLINOIS, ASSIGNORS TO HYGIENIC RENOVATING COMPANY, OF CHICAGO, ILLINOIS, A CORPORATION OF ILLINOIS.

RENOVATING SYSTEM.

No. 928,940.  Specification of Letters Patent.  Patented July 27, 1909.

Application filed April 20, 1907. Serial No. 369,228.

*To all whom it may concern:*

Be it known that we, GEORGE CLEMENTS and JAMES M. HOSTLER, citizens of the United States, residing at Chicago, in the county of Cook and State of Illinois, have invented certain new and useful Improvements in Renovating Systems, of which the following is a specification.

Our invention relates to renovating systems and is illustrated in the accompanying drawing which presents a side elevation of the essential parts of such a system.

A is a dry dust settling tank, to be known as the dust tank.

B is a mud settling tank, to be known as the wet tank.

C is an air cleaning tank.

D is a suction pipe leading from the point where the dry dust is to be collected to the tank A.

E is a pipe leading from the point where the scrubbing is done to the tank B.

F is a pipe leading from the tank A and terminating in the coupling G whence leads the pipe H H to the coupling J, whence leads the pipe K to the air washing glass L.

M is a pipe leading from the bottom of the tank C and from below the water line to the coupling J.

N is a blow-off pipe in the bottom of the tank C.

O is a pipe which connects the two tanks C and A and which has a check valve P adapted to close when there is a tendency for the current to move in the direction indicated by the arrow.

R is a pipe which leads from the top of the tank B to the coupling G.

S is a suction pipe leading from the top of the tank C to the pump.

T is a vacuum valve connected with the pipe R.

This drawing is to be taken as diagrammatic and is intended only to show one application of our invention. Of course the parts may be differently located with reference to each other and may be differently shaped.

The use and operation of our invention are as follows: In a system of renovating or cleaning a house and its furniture and carpets, it is necessary to provide for both dry and wet cleaning processes. In the dry cleaning process the dust is allowed to settle and the air is then cleaned. In the wet cleaning process water, or mud which it contains, is allowed to settle and the air is passed out through the pump. We have endeavored to use one tank for both purposes, that is to connect the dry suction pipe and the wet suction pipe to one and the same settling tank. The result of this is that the pipes speedily become clogged and the apparatus is inoperative. We then provided a second or wet settling tank and delivered the air from it directly to the pump. This air, however, was still filled with dust and was injurious to the pump. We then invented the system which is here presented wherein the two systems are separated up to the point where the air separation from the heavier materials is effected and then uniting the two settlements in a single air cleaning and pumping tank. In such apparatus we also found that there was a tendency on occasion for the water in the air cleaning tank to flow back into the settling tank when the pump stopped operating. To avoid this we connected the air cleaning and settling tank by a pipe and check valve, the check valve closing when the current flowed in the normal outward direction so as to prevent, while the pump was operating, the passage of the air directly from the settling chamber to the top of the air cleaning chamber. This check valve, however, permits the pipe to open in the opposite direction and equalizes the pressure in the two tanks so as to prevent the backward flow of the water in the air cleaning tank into the settling tank. When a plant is equipped for operation one or more of the cleaning devices connected with it are likely to be at any given time cut off from use, valves somewhere in the pipes D or E being for that purpose closed. The result is that the pump proceeds to develop a still higher vacuum in the tank at an unnecessary waste of energy. We obviate this result by connecting a vacuum valve to the two settling tanks preferably at the point indicated in the pipe which joins them. The air charged with dust and dirt is first drawn into the tank A where a certain amount of dust is deposited in the bottom. Thence the air, still charged with dust to a certain extent, is carried forward through the pipes into the washing device L whence it passes into the tank which contains water. Out of this tank the air substantially freed from its dust and dirt is drawn out through the pipe S and discharged. The dust and dirt not collected in the dry tank A is absorbed by the water in the tank C. This circulation may be carried on by means of the pump which is attached to the pipe S. Through the pipe E the water from the scrubbing operation is brought up into the tank B where the solid matter settles and the air and a certain amount of water is carried through the pipe R into the previously described circulating system.

We claim:

1. In a renovating system, the combination of a dry settling tank with a wet settling tank, inlet pipes leading into each from the point where work is to be done, an air cleaning tank, outlets from the first mentioned tanks leading thereinto, a pipe forming part of said inleading connection and extending from below the line of water in the air cleaning tank to a point above the line of water in such tank, and an outlet from the air cleaning tank leading to a suction pump.

2. In a renovating system, the combination of a dry settling tank with a wet settling tank, inlet pipes leading into each from the point where work is to be done, an air cleaning tank, outlets from the first mentioned tanks leading thereinto, an outlet from the air cleaning tank leading to a suction pump, and a vacuum valve connected with the air pipes leading from the two settling tanks to the air cleaning tank.

3. In a renovating system, the combination of a dry settling tank with a wet settling tank, inlet pipes leading into each from the point where work is to be done, an air cleaning tank, outlets from the first mentioned tanks leading thereinto, a pipe forming part of said inleading connection and extending from below the line of water in the air cleaning tank to a point above the line of water in such tank, an outlet from the air cleaning tank leading to a suction pump, and a vacuum valve connected with the air pipes leading from the two said tanks to the air cleaning tank.

4. In a renovating system, the combination of a dry settling tank with a wet settling tank, inlet pipes leading into each from the point where work is to be done, an air cleaning tank, outlets from the first mentioned tanks leading thereinto, an outlet from the air cleaning tank leading to a suction pump, and an equalizing pipe connecting the dry settling tank and the air cleaning tank and having a check valve therein, as described.

5. In a renovating system, the combination of a dry settling tank with a wet settling tank, inlet pipes leading into each from the point where work is to be done, an air cleaning tank, outlets from the first mentioned tanks leading thereinto, a pipe forming part of said inleading connection and extending from below the line of water in the air cleaning tank to a point above the line of water in such tank, an outlet from the air cleaning tank leading to a suction pump, and an equalizing pipe connecting the dry settling tank and the air cleaning tank and having a check valve therein, as described.

6. In a renovating system, the combination of a dry settling tank with an air cleaning tank, an inleading pipe from the point where the work is to be done to the dry settling tank and two connections between the dry settling tank and the air cleaning tank, one connecting their two air spaces and provided with a check valve, the other containing in part a pipe which leads from below the water line of the air cleaning tank to above the water line, and an outlet from the air cleaning tank to the pump.

GEORGE CLEMENTS.
JAMES M. HOSTLER.

Witnesses:
ABBIE E. JOHNSON,
SOPHIE B. WERNER.